(12) United States Patent
Sato et al.

(10) Patent No.: US 11,913,800 B2
(45) Date of Patent: Feb. 27, 2024

(54) TERMINAL DEVICE, INFORMATION PROCESSING METHOD, AND PROGRAM FOR TERMINAL DEVICE

(71) Applicant: PIONEER CORPORATION, Tokyo (JP)

(72) Inventors: Yukihiro Sato, Tokyo (JP); Hirotatsu Hiruta, Tokyo (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 17/778,149

(22) PCT Filed: Nov. 17, 2020

(86) PCT No.: PCT/JP2020/042822
§ 371 (c)(1),
(2) Date: May 19, 2022

(87) PCT Pub. No.: WO2021/100708
PCT Pub. Date: May 27, 2021

(65) Prior Publication Data
US 2023/0003541 A1   Jan. 5, 2023

(30) Foreign Application Priority Data

Nov. 19, 2019   (JP) .................................. 2019-208796

(51) Int. Cl.
*G01C 21/36*   (2006.01)
*H04L 41/0803*   (2022.01)

(52) U.S. Cl.
CPC ...... *G01C 21/3661* (2013.01); *H04L 41/0803* (2013.01)

(58) Field of Classification Search
CPC ........... G01C 21/3661; H04L 41/0803; H04M 1/724098; H04M 1/72454
See application file for complete search history.

(56) References Cited

U.S. PATENT DOCUMENTS

| | | | |
|---|---|---|---|
| 2008/0114534 A1 | 5/2008 | Yamazaki et al. | |
| 2010/0220250 A1* | 9/2010 | Vanderwall | G01C 21/3688 455/152.1 |
| 2011/0021234 A1 | 1/2011 | Tibbitts et al. | |
| 2015/0310577 A1* | 10/2015 | Cabasse | G06T 1/20 345/522 |

(Continued)

FOREIGN PATENT DOCUMENTS

| | | |
|---|---|---|
| JP | 2007-051884 A | 3/2007 |
| JP | 2019-506586 A | 9/2010 |

(Continued)

*Primary Examiner* — Brian P Sweeney
(74) *Attorney, Agent, or Firm* — Procopio, Cory, Hargreaves & Savitch LLP

(57) ABSTRACT

Provided is a terminal device and the like that can switch a mode of operation as a terminal device in relation to an on-board device to which the terminal device is attached. A terminal device T that is attached to an attachment target device M and that communicates with the attachment target device M comprises a switching means 1 that switches a mode of operation of the terminal device T on the basis of a state of attachment to the attachment target device M and a state of communication with the attachment target device M.

7 Claims, 2 Drawing Sheets

(56) References Cited

U.S. PATENT DOCUMENTS

| | | |
|---|---|---|
| 2016/0273930 A1 | 9/2016 | Wada et al. |
| 2017/0215031 A1 | 7/2017 | Harding et al. |
| 2018/0332432 A1 | 11/2018 | Harding et al. |

FOREIGN PATENT DOCUMENTS

| | | | |
|---|---|---|---|
| JP | 2010190594 A | * | 9/2010 |
| JP | 2015-58894 A | | 3/2015 |
| JP | 2015-537479 A | | 12/2015 |
| JP | 2016-176765 A | | 10/2016 |
| JP | 2010-190594 A | | 3/2019 |
| WO | 2018/025273 A1 | | 2/2018 |

* cited by examiner

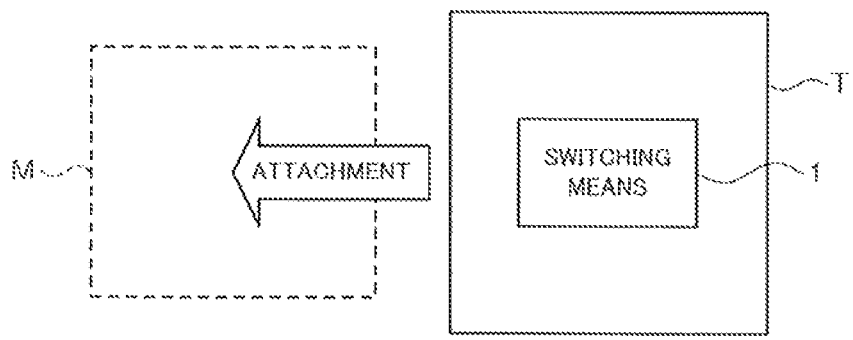
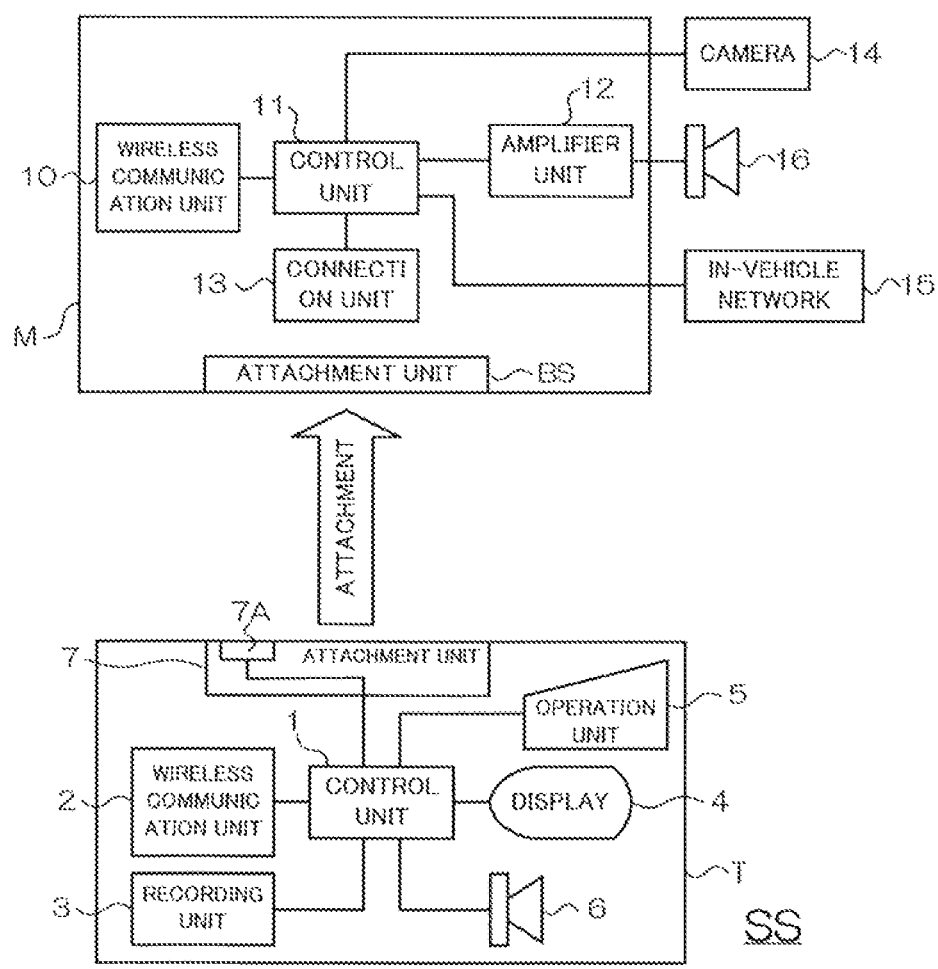

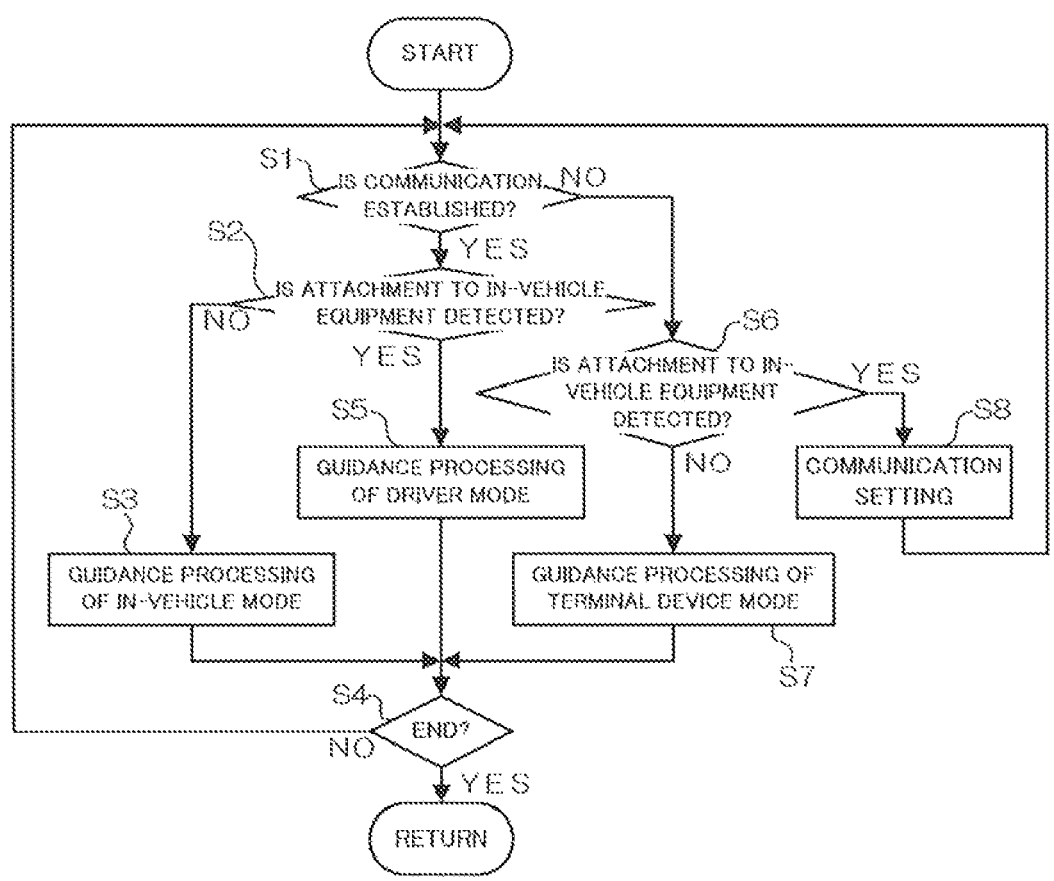

TERMINAL DEVICE, INFORMATION PROCESSING METHOD, AND PROGRAM FOR TERMINAL DEVICE

CROSS-REFERENCE TO RELATED APPLICATIONS

This application is US National Stage of International Patent Application PCT/JP2020/042822, filed Nov. 17, 2020, which claims benefit of priority from Japanese Patent Application JP2019-208796, filed Nov. 19, 2019, the contents of both of which are incorporated herein by reference.

TECHNICAL FIELD

The present application belongs to the technical fields of a terminal device, an information processing method, and a program for a terminal device. More specifically, the present application belongs to the technical fields of a terminal device that can be attached to an attachment target device, information processing executed in the terminal device, and a program for the terminal device.

BACKGROUND ART

In recent years, an in-vehicle audio visual (AV) system has been inexpensively configured by using a display function using a display comprised in a mobile terminal, a navigation function, a content reproduction function or the like by linking the mobile terminal such as a so-called smartphone or a tablet personal computer (PC) with in-vehicle equipment installed in a vehicle for example. Examples of prior art documents disclosing such conventional art include Patent Document 1 described below.

Patent Document 1 discloses an in-vehicle system comprising in-vehicle equipment fixed to an interior portion of a vehicle or the like, and a mobile terminal that performs image display while transmitting an audio signal to the in-vehicle equipment by near-field wireless communication with the in-vehicle equipment in a state of being detachably attached to the in-vehicle equipment. Then, the in-vehicle system disclosed in Patent Document 1 is configured to acquire a delay state of transmission and reception of an audio signal by near-field wireless communication and perform processing of suppressing a time lag between a display image and output audio.

CITATION LIST

Patent Document

Patent Document 1: JP 2015-58894 A

SUMMARY OF THE INVENTION

Problem to be Solved by the Invention

On the other hand, it is conceivable that the mobile terminal is used not only inside the vehicle but also outside the vehicle, for example, during gait of the user. In addition, even in the case of use in the vehicle, a case where the mobile terminal is used by a passenger other than the driver is assumed in addition to a case where the mobile terminal is used by the driver. Therefore, for the mobile terminal that is assumed to be used in various modes as described above, it is preferable that the operation and function can be changed according to each use mode.

However, the mobile terminal disclosed in Patent Document 1 described above does not mention at all the configuration corresponding to the aforementioned demand. Therefore, the technology disclosed in Patent Document 1 described above cannot meet the demand.

Thus, the present application has been made in view of the aforementioned demand, and an example of the object is to provide a terminal device capable of switching an operation mode of the terminal device in relation to in-vehicle equipment to which the terminal device is attached, information processing executed in the terminal device, and a program for the terminal device.

Means for Solving the Problem

In order to solve the above-mentioned problem, the invention described in claim 1 is a terminal device attached to an attachment target device and performing communication with the attachment target device, the terminal device comprising a switching means that switches an operation mode of the terminal device on a basis of an attachment state on the attachment target device and a communication state with the attachment target device.

In order to solve the above-mentioned problem, the invention described in claim 6 is an information processing method executed in a terminal device attached to an attachment target device, performing communication with the attachment target device, and including a switching means, the method comprising a switching step of switching an operation mode of the terminal device by the switching means on a basis of an attachment state on the attachment target device and a communication state with the attachment target device.

In order to solve the above-mentioned problem, the invention described in claim 8 causes a computer included in a terminal device attached to an attachment target device and performing communication with the attachment target device to function as a switching means that switches an operation mode of the terminal device on a basis of an attachment state on the attachment target device and a communication state with the attachment target device.

BRIEF DESCRIPTION OF THE DRAWINGS

FIG. 1 is a block figure illustrating a schematic configuration of a terminal device of an embodiment.

FIG. 2 is a block figure illustrating a schematic configuration of each of in-vehicle equipment and a terminal device of an example.

FIG. 3 is a flowchart illustrating information processing in the terminal device of the example.

EMBODIMENT FOR CARRYING OUT THE INVENTION

Next, an embodiment for carrying out the present application will be described with reference to FIG. 1. Note that FIG. 1 is a block figure illustrating a schematic configuration of a terminal device of the embodiment.

As illustrated in FIG. 1, a terminal device T of an embodiment is a terminal device T that is attached to an attachment target device M and communicates with the attachment target device M.

Then, the terminal device T comprises a switching means 1 that switches the operation mode of the terminal device T on the basis of the attachment state on the attachment target device M and the communication state with the attachment target device M.

As described above, by the operation of the terminal device T of the embodiment, since the operation mode is switched on the basis of the attachment state on the attachment target device M and the communication state with the attachment target device M, the operation mode of the terminal device T can be automatically switched in relation to the attachment target device M.

EXEMPLARY EMBODIMENTS

Next, a specific example corresponding to the above-described embodiment will be described with reference to FIGS. 2 and 3. Note that the example described below is an example to which the present application is applied in a case where, in an in-vehicle system including, for example, in-vehicle equipment mounted on a vehicle and a terminal device that can be attached to the in-vehicle equipment and can be used alone, the terminal device and the in-vehicle equipment cooperate to perform various types of processing.

In addition, FIG. 2 is a block figure illustrating a schematic configuration of each of the in-vehicle equipment and the terminal device of the example, and FIG. 3 is a flowchart illustrating information processing in the terminal device of the example. At this time, in FIG. 2, for the constituent members of the example corresponding to the constituent members of each of the terminal device T and the attachment target device M of the embodiment illustrated in FIG. 1, the same member numbers as the respective constituent members of the terminal device T and the attachment target device M are used.

As illustrated in FIG. 2, an in-vehicle system SS of the example is configured to comprise in-vehicle equipment M provided in, for example, a center console or a dashboard of a vehicle, and a terminal device T of a portable type that can be attached to the in-vehicle equipment M and can be used alone. At this time, the terminal device T may be realized as, for example, a tablet-type terminal device, or may be realized as a so-called smartphone.

Then, as illustrated in the upper part of FIG. 2, the in-vehicle equipment M of the example is connected to, for example, a vehicle speaker 16, a camera 14, and an in-vehicle network 15 installed in the vehicle on which the in-vehicle system SS of the example is mounted, and comprises an attachment unit BS used for attachment of the terminal device T, a wireless communication unit 10, a control unit 11 including a central processing unit (CPU), read only memory (ROM), random access memory (RAM), and the like, and an amplifier unit 12 connected to the aforementioned vehicle speaker 16. At this time, the camera 14 corresponds to an example of the "imaging means" of the present application.

At this time, the camera 14 is a camera that captures images of the front, rear, inside, and the like of the vehicle to be visually recognized as driving support information by the driver of the vehicle, images cyclically, for example, the imaging range as necessary under the control of the control unit 11, and outputs image data, which is an imaging result, to the control unit 11. In addition, the control unit 11 acquires, from the in-vehicle network 15, information indicating a vehicle state, such as speed data indicating the speed of the aforementioned vehicle, reverse gear data indicating that so-called reverse gear is turned on in the vehicle. Thus, for example, in a case where the reverse gear data is acquired, the control unit 11 controls the camera 14 so that the aforementioned image data includes the result of imaging the rear of the vehicle. On the other hand, the attachment unit BS comprises a connection unit, which is not illustrated, for performing wired electrical connection with the terminal device T, and the terminal device T is attached to the attachment unit BS.

In the above configuration, in a case where the terminal device T is not attached, under the control of the control unit 11, the wireless communication unit 10 controls reception of a sound signal indicating the sound of content reproduced by the terminal device T or an audio signal indicating an audio for guidance processing to be described below executed by the terminal device T, from the terminal device T. In addition, under the control of the control unit 11, the amplifier unit 12 outputs the aforementioned sound signal and the aforementioned audio signal to the vehicle speaker 16 to cause the vehicle speaker SP to emit the sound and the audio. In these operations, the control unit 11 controls reception of each of the aforementioned sound signal and the aforementioned audio signal from the terminal device T by the wireless communication unit 10, and controls a mode of the sound and audio emission from the vehicle speaker 16.

In addition to the above, in a case where the terminal device T is attached, the control unit 11 outputs the aforementioned image data acquired from the camera 14 to the terminal device T via the aforementioned connection unit of the attachment unit BS, and in a case where the vehicle state acquired from the in-vehicle network 15 satisfies a preset condition that is a condition in which the aforementioned image data is to be displayed as an interrupt image on a display 4 of the terminal device T, generates image interrupt request data for requesting the terminal device T to perform interrupt display and outputs the image interrupt request data to the terminal device T via the aforementioned connection unit. Further, in a case where the speed of the aforementioned vehicle indicated by the aforementioned speed data acquired from the in-vehicle network 15 becomes equal to or higher than a preset travel restriction threshold value, the control unit 11 generates travel restriction instruction data indicating that the speed becomes equal to or higher than the travel restriction threshold value, and outputs the travel restriction instruction data to the terminal device T via the aforementioned connection unit. At this time, the threshold speed corresponding to the aforementioned travel restriction threshold value is a speed set in advance as a threshold speed at which display of, for example, a moving image or the like that attracts the driver's attention needs to be restricted from the viewpoint of safe driving, for example, on a display or the like visually recognized by the driver of the vehicle during driving at a speed equal to or higher than the threshold speed. In addition to the above, in a case where the terminal device T is attached, the control unit 11 controls the aforementioned amplifier unit 12 and the like on the basis of various data exchanged with the terminal device T via the aforementioned connection unit. Note that even in a case where the terminal device T is connected, the aforementioned image data, the aforementioned image interrupt request data, the aforementioned travel restriction instruction data, and the aforementioned various data may be exchanged with the terminal device T via the wireless communication unit 10.

On the other hand, as illustrated in the lower part of FIG. 2, the terminal device T of the example is a terminal device T that is used by being attached to the in-vehicle equipment M and can be used alone as described above, and comprises an attachment unit 7 used for attachment to the in-vehicle equipment M, a control unit 1 including a CPU, ROM, RAM, and the like, a wireless communication unit 2, a recording unit 3 including a recording medium such as a hard disc drive (HDD) or a solid state drive (SSD), the display 4 including a liquid crystal display or the like, an operation unit 5 including a touch panel, an operation button, or the like, and a speaker 6. At this time, the control unit 1 corresponds to an example of the switching means 1 of the embodiment, and the display 4 corresponds to an example of the "display means" of the present application.

In the above configuration, the attachment unit 7 comprises a detection unit 7A that, for example, physically detects that the terminal device T is attached to the attachment unit BS of the in-vehicle equipment M. In a case where the terminal device T is attached to the in-vehicle equipment M, the detection unit 7A outputs, to the control unit 1, an attachment detection signal indicating that the terminal device T has been attached. Thus, the control unit 1 recognizes that the terminal device T is attached to the in-vehicle equipment M. Note that the attachment unit 7 comprises a connection unit, which is not illustrated, for performing wired electrical connection with the in-vehicle equipment M, and this connection unit may also serve as the aforementioned detection unit 7A.

On the other hand, in the recording unit 3, image data and sound data for reproducing the aforementioned content are recorded, for example, in advance and in a nonvolatile manner. Then, the recording unit 3 outputs the image data and the like to the control unit 1 as necessary under the control of the control unit 1. On the other hand, in a case where the terminal device T is not attached to the in-vehicle equipment M, the wireless communication unit 2 controls transmission of the aforementioned sound signal and the aforementioned audio signal to the in-vehicle equipment M under the control of the control unit 1. At this time, the control unit 1 detects a communication status (that is, whether or not wireless communication is established between the wireless communication unit 10 and the wireless communication unit 2) between the wireless communication unit 10 of the in-vehicle equipment M and the wireless communication unit 2 of the terminal device T by using the wireless communication unit 2. Further, the operation unit 5 generates an operation signal corresponding to various operations performed in the operation unit 5 and outputs the operation signal to the control unit 1.

In these operations, the control unit 1 executes information processing of the example including guidance processing on the basis of the aforementioned operation signal corresponding to the operation for the guidance processing of the example performed in the aforementioned operation unit 5. The guidance processing of the aforementioned example will be described in detail below. Further, the control unit 1 controls transmission of each of the aforementioned sound signal and the aforementioned audio signal to the in-vehicle equipment M by the wireless communication unit 2, and controls reception of the aforementioned image interrupt request data and the aforementioned travel restriction instruction data from the in-vehicle equipment M via each of the aforementioned connection units (that is, the connection unit provided in the attachment unit BS of the in-vehicle equipment M and the connection unit provided in the attachment unit 7) in a case where the terminal device T is attached to the in-vehicle equipment M. Furthermore, the control unit 1 exchanges various data (that is, exchange of the aforementioned image data, the aforementioned image interrupt request data, the aforementioned travel restriction instruction data, and the like) with the in-vehicle equipment M via the wireless communication unit 2 or the connection unit of the attachment unit 7, and controls image display and sound and audio emission unique to the terminal device T in a case where the terminal device T is not attached to the in-vehicle equipment M.

Next, information processing (including the aforementioned guidance processing) of the example mainly executed by the control unit 1 of the terminal device T will be described more specifically with reference to FIGS. 2 and 3.

The information processing of the example is executed, for example, as interrupt processing in the terminal device T, for example, after the timing when the power of each of the in-vehicle equipment M and the terminal device T is turned on. That is, as illustrated in FIG. 3, when the information processing of the example is started, first, the control unit 1 monitors whether or not wireless communication between the wireless communication unit 2 and the wireless communication unit 10 is established on the basis of the aforementioned communication status detected using the wireless communication unit 2 (step S1). In the monitoring in step S1, in a case where the wireless communication is not established (step S1: NO), the control unit 1 proceeds to step S6 described below. On the other hand, in the monitoring in step S1, in a case where the aforementioned wireless communication is established (step S1: YES), the control unit 1 then determines whether or not the aforementioned attachment detection signal is output from the detection unit 7A (step S2). In the determination in step S2, in a case where the aforementioned attachment detection signal is not output, that is, in a case where the terminal device T is not attached to the in-vehicle equipment M (step S2: NO), the control unit 1 controls each of the constituent members of the terminal device T and the in-vehicle equipment M so as to execute the aforementioned guidance processing as an "in-vehicle mode" to be described below (step S3). The guidance processing as the in-vehicle mode will be described in detail below with reference to Table 1.

Note that each of the aforementioned in-vehicle mode, and a driver mode and a terminal device mode to be described below corresponds to an example of the operation mode of the embodiment.

Through step S3 described above, the control unit 1 executing the guidance processing as the aforementioned in-vehicle mode monitors whether or not to end the guidance processing for the reason that, for example, the vehicle on which the in-vehicle system SS is mounted arrives at the destination of the guidance processing (step S4). In the monitoring of step S4, in a case where the guidance processing is ended (step S4: YES), the control unit 1 proceeds to another processing of the terminal device T. On the other hand, in the monitoring in step S4, in a case where the guidance processing of the example is continued (step S4: NO), the control unit 1 returns to step S1 described above and continues the series of processing described above.

Next, the guidance processing as the aforementioned in-vehicle mode of the example will be described more specifically with reference to Table 1 described below.

TABLE 1

| | | Search target | Guidance output destination | Image interrupt | Travel restriction |
|---|---|---|---|---|---|
| Mode | In-vehicle mode | Vehicle route | Vehicle speaker | Not available | Not available |
| | Driver mode | | Display Vehicle speaker | Available | Available |

TABLE 1-continued

| | Search target | Guidance output destination | Image interrupt | Travel restriction |
|---|---|---|---|---|
| Terminal device mode | Walking route | Display Built-in speaker | Not available | Not available |

As described above, the guidance processing as the in-vehicle mode of the example is executed in a case where the wireless communication between the wireless communication unit 2 of the terminal device T and the wireless communication unit 10 of the in-vehicle equipment M is established (see step S1: YES in FIG. 3) and the terminal device T is not attached to the in-vehicle equipment M (see step S2: NO in FIG. 3). In this case, in the terminal device T, for example, a situation is assumed in which a passenger riding on a rear seat or a passenger seat of a vehicle on which the in-vehicle system SS is mounted uses the terminal device T and wireless communication between the terminal device T and the in-vehicle equipment M is established. In the guidance processing in this case, as indicated in Table 1, the control unit 1 of the terminal device T searches for a movement route on which the vehicle on which the in-vehicle system SS is mounted moves as a vehicle route. In this case, the control unit 1 searches for the aforementioned vehicle route on the basis of, for example, destination data indicating a destination in movement using the vehicle separately input using the operation unit 5 of the terminal device T, present position data indicating the present position of the vehicle obtained by receiving a navigation radio wave, for example, from a navigation satellite of a global positioning system (GPS), which is not illustrated, and the like. Then, the control unit 1 transmits an audio signal corresponding to a guidance audio necessary for the guidance processing along the vehicle route to the in-vehicle equipment M via, for example, the connection units provided in the attachment unit 7 and the attachment unit BS, and causes the guidance audio corresponding to the audio signal to be emitted via the vehicle speaker 16 connected to the in-vehicle equipment M. Further, since the terminal device T performing the guidance processing as the in-vehicle mode is assumed to be used by the aforementioned passenger (that is, the passenger who visually recognizes the image displayed on the display 4), it is not necessary to present images of the front, rear, inside, and the like of the vehicle as the driving support information to the passenger, and therefore, the control unit 1 prohibits image interrupt to the display on the display 4 on the basis of the aforementioned image interrupt request data, which is performed by acquiring the aforementioned image data corresponding to the imaging result by the camera 14 from the in-vehicle equipment M. Furthermore, the control unit 1 also prohibits travel restriction (that is, the restriction of the display of a moving image or the like on the display 4 at a speed equal to or higher than the aforementioned threshold speed from the viewpoint of safe driving) based on the aforementioned travel restriction instruction data from the in-vehicle equipment M.

On the other hand, in the determination in step S2 described above, in a case where the aforementioned attachment detection signal is output, that is, in a case where the terminal device T is attached to the in-vehicle equipment M (step S2: YES), the control unit 1 controls each of the constituent members of the terminal device T and the in-vehicle equipment M so as to execute the aforementioned guidance processing as the "driver mode" to be described below (step S5). The guidance processing as the driver mode will be described in detail below with reference to Table 1. Thereafter, the control unit 1 proceeds to the monitoring in step S4 described above.

Next, the guidance processing as the aforementioned driver mode of the example will be described more specifically with reference to Table 1 described above. As described above, the guidance processing as the driver mode of the example is executed in a case where the wireless communication between the wireless communication unit 2 of the terminal device T and the wireless communication unit 10 of the in-vehicle equipment M is established (see step S1: YES in FIG. 3) and the terminal device T is attached to the in-vehicle equipment M (see step S2: YES in FIG. 3). In this case, a situation in which the terminal device T is used by the aforementioned driver to receive movement guidance is assumed. In the guidance processing in this case, the control unit 1 of the terminal device T searches for the aforementioned vehicle route as indicated in Table 1. Then, the control unit 1 causes the guidance audio necessary for the guidance processing along the vehicle route to be emitted via the vehicle speaker 16 similarly to the guidance processing as the aforementioned in-vehicle mode, and displays an image such as a map image necessary for the guidance processing on the display 4. Further, the control unit 1 executes both the aforementioned image interrupt as necessary on the basis of the aforementioned image interrupt request data from the in-vehicle equipment M and the aforementioned travel restriction as necessary on the basis of the aforementioned travel restriction instruction data from the in-vehicle equipment M. Here, a typical example of the image interrupt is interruption of the display 4 by an image of the rear of the vehicle in a case where the gear of the vehicle is set to the reverse gear.

On the other hand, in the monitoring in step S1 described above, in a case where the aforementioned wireless communication is not established (step S1: NO), the control unit 1 then determines whether or not the aforementioned attachment detection signal is output from the detection unit 7A (step S6) as in step S2 described above. In a case where it is determined in the determination in step S6 that the aforementioned attachment detection signal is output and thus the terminal device T is attached to the in-vehicle equipment M (step S6: YES), for example, the control unit 1 displays, on the display 4, for example, a setting screen that urges setting of wireless communication between the wireless communication unit 10 of the in-vehicle equipment M and the wireless communication unit 2 of the terminal device T so as to urge the person who uses the terminal device T to set the wireless communication (step S8). Thereafter, the control unit 1 returns to step S1 described above and continues the series of processing described above.

On the other hand, in the determination in step S6 described above, in a case where the aforementioned attachment detection signal is not output and thus it is not determined that the terminal device T is not attached to the in-vehicle equipment M (step S6: NO), the control unit 1 controls each of the constituent members of the terminal device T so as to execute the aforementioned guidance processing as the "terminal device mode" to be described below (step S7). The guidance processing as the terminal device mode will be described in detail below with reference to Table 1 described above. Thereafter, the control unit 1 proceeds to the monitoring in step S4 described above.

Next, the guidance processing as the aforementioned terminal device mode will be described more specifically with reference to Table 1 described above. As described above, the guidance processing as the terminal device mode of the example is executed in a case where the wireless communication between the wireless communication unit 2 of the terminal device T and the wireless communication unit 10 of the in-vehicle equipment M is not established (see step S1: NO in FIG. 3) and the terminal device T is not attached to the in-vehicle equipment M (see step S6: NO in FIG. 3). In this case, for example, a situation in which the terminal device T is taken out of the vehicle (that is, carried) and used is assumed. In the guidance processing in this case, as indicated in Table 1, the control unit 1 of the terminal device T searches for a movement route on which the person who carries the terminal device T moves, for example, on foot (without using the vehicle on which the in-vehicle system SS is mounted) as a walking route. In this case, the control unit 1 searches for the aforementioned walking route on the basis of, for example, destination data indicating a destination in walking movement input using the operation unit 5 of the terminal device T, current position data indicating the current position of the terminal device T, and the like. Then, the control unit 1 causes a guidance audio necessary for the guidance processing along the walking route to be emitted via the speaker 6 of the terminal device T. Further, since the terminal device T performing the guidance processing as the terminal device mode is assumed to be used outside the vehicle as described above, the control unit 1 displays an image necessary for the guidance processing on the display 4. Further, the control unit 1 does not perform the aforementioned image interrupt or the aforementioned travel restriction.

As described above, according to the information processing mainly by the terminal device T of the in-vehicle system SS of the example, the operation mode (in-vehicle mode and the like (see Table 1)) is switched on the basis of the attachment state on the in-vehicle equipment M and the wireless communication state with the in-vehicle equipment M, and therefore, the operation mode of the terminal device T can be automatically switched in relation to the in-vehicle equipment M.

In addition, in a case where the in-vehicle equipment M is provided in the vehicle and the terminal device T is in a non-attachment state with respect to the in-vehicle equipment M (see step S2: NO in FIG. 3) and the wireless communication therebetween is possible (see step S1: YES in FIG. 3), the operation mode of the terminal device T is switched to the in-vehicle mode (see step S3 in FIG. 3), and in a case where the terminal device T is attached to the in-vehicle equipment M (see step S2: YES in FIG. 3) and the communication is possible (see step S1: YES in FIG. 3), the operation mode is switched to the driver mode (see step S5 in FIG. 3), and therefore, the operation mode of the terminal device T can be appropriately switched in relation to the in-vehicle equipment M provided in the vehicle.

Further, since the aforementioned in-vehicle mode is a mode including the vehicle route search processing and the output control processing for the sound from the vehicle speaker 16 for movement guidance, and the driver mode is a mode including the search processing and the sound output control processing and the output control processing for the image on the display 4 for movement guidance, the movement guidance of the vehicle can be appropriately performed according to the attachment state of the terminal device T on the in-vehicle equipment M and the mutual communication state.

Furthermore, since the aforementioned driver mode includes display control processing for an image captured by the camera 14 mounted on the vehicle on the display 4, it is possible to contribute to safe movement of the vehicle in addition to the movement guidance of the vehicle.

In addition, in a case where the terminal device T is in a non-attachment state with respect to the in-vehicle equipment M (see step S6: NO in FIG. 3) and communication therebetween is not possible (see step S1: NO in FIG. 3), the operation mode of the terminal device T is switched to the terminal device mode (see step S7 in FIG. 3), and therefore, the operation mode of the terminal device T can automatically correspond to use outside the vehicle.

Further, since the aforementioned terminal device mode is a mode including the search processing for the walking route of the person who carries and uses the terminal device T, the output control processing for the sound from the speaker 6 for movement guidance, and the output control processing for the image on the display 4, the movement guidance of the person who carries and uses the terminal device T can be appropriately performed according to the attachment state of the terminal device T on the in-vehicle equipment M and the mutual communication state.

Note that a program corresponding to the flowchart illustrated in FIG. 3 can be recorded in a recording medium such as an optical disk or a hard disk, or can be acquired via a network such as the Internet, and can be read and executed by a microcomputer or the like, so that the microcomputer or the like can be caused to function as the control unit 1 according to the example.

EXPLANATION OF REFERENCE NUMERALS

1 Switching means (control unit 1)
4 Display
6 Speaker
M Attachment target device (in-vehicle equipment)
T Terminal device
SS In-vehicle system

The invention claimed is:

1. A terminal device being able to be attached to an attachment target device and being able to communicate with the attachment target device, the terminal device comprising:
   a controller that switches an operation mode of the terminal device on a basis of an attachment state on the attachment target device and a communication state with the attachment target device,
   wherein the attachment target device is provided in a vehicle,
   wherein the operation mode is:
      a first operation mode corresponding to use of the terminal device by a passenger of the vehicle other than a driver of the vehicle; or
      a second operation mode corresponding to use of the terminal device by the driver,
   wherein the controller switches the operation mode to the first operation mode in a case where the terminal device is in a non-attachment state with respect to the attachment target device and the communication is established, and
   wherein the controller switches the operation mode to the second operation mode in a case where the terminal device is attached with respect to the attachment target device and the communication is established.

2. The terminal device according to claim 1, wherein
the first operation mode is an operation mode including search processing for searching for a movement route of the vehicle and a sound output control processing for causing a sound to be used for guidance of movement of the vehicle using the searched movement route to be output via a speaker mounted on the vehicle, and
the second operation mode is an operation mode including the search processing, the sound output control processing, and image output control processing of causing an image used for the guidance to be displayed via a display unit comprised in the terminal device.

3. The terminal device according to claim 2, wherein
the second operation mode further includes display control processing of causing the display unit to display an image imaged by an imaging unit mounted on the vehicle.

4. The terminal device according to claim 1, wherein
the operation mode is:
  the first operation mode;
  the second operation mode; or
  a third operation mode corresponding to use of the terminal device outside the vehicle, and
the controller switches the operation mode to the third operation mode in a case where the terminal device is in a non-attachment state with respect to the attachment target device and the communication is not established.

5. The terminal device according to claim 4, wherein the third operation mode is an operation mode including:
second search processing for searching for a movement route of a person who carries the terminal device; and
at least one of second sound output control processing for causing a sound to be used for guidance of movement of the person using the movement route searched by the second search processing to be output via a speaker mounted on the terminal device, or second image output control processing of causing an image to be used for guidance of movement of the person to be displayed via a display unit comprised in the terminal device.

6. An information processing method executed in a terminal device being able to be attached to an attachment target device, being able to communicate with the attachment target device, and including a controller, the method comprising:
switching an operation mode of the terminal device by the controller on a basis of an attachment state on the attachment target device and a communication state with the attachment target device,
wherein the attachment target device is provided in a vehicle,
wherein the operation mode is:
  a first operation mode corresponding to use of the terminal device by a passenger of the vehicle other than a driver of the vehicle; or
  a second operation mode corresponding to use of the terminal device by the driver,
wherein the controller switches the operation mode to the first operation mode in a case where the terminal device is in a non-attachment state with respect to the attachment target device and the communication is established, and
wherein the controller switches the operation mode to the second operation mode in a case where the terminal device is attached with respect to the attachment target device and the communication is established.

7. A non-transitory computer-readable medium having instructions executable by a computer included in a terminal device being able to be attached to an attachment target device and being able to communicate with the attachment target device, the instructions comprising:
switching an operation mode of the terminal device on a basis of an attachment state on the attachment target device and a communication state with the attachment target device,
wherein the attachment target device is provided in a vehicle,
wherein the operation mode is:
  a first operation mode corresponding to use of the terminal device by a passenger of the vehicle other than a driver of the vehicle; or
  a second operation mode corresponding to use of the terminal device by the driver,
wherein the operation mode is switched to the first operation mode in a case where the terminal device is in a non-attachment state with respect to the attachment target device and the communication is established, and
wherein the switching switches the operation mode to the second operation mode in a case where the terminal device is attached with respect to the attachment target device and the communication is established.

* * * * *